United States Patent
Li et al.

(10) Patent No.: US 10,948,634 B2
(45) Date of Patent: Mar. 16, 2021

(54) PRISM SHEET, BACKLIGHT MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Tao Li, Beijing (CN); Zhuhua Nie, Beijing (CN); Qingping Yin, Beijing (CN); Qian Wang, Beijing (CN); Jianan Wang, Beijing (CN); Site Cai, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/639,915

(22) PCT Filed: Nov. 28, 2018

(86) PCT No.: PCT/CN2018/117951
§ 371 (c)(1),
(2) Date: Feb. 18, 2020

(87) PCT Pub. No.: WO2019/144698
PCT Pub. Date: Aug. 1, 2019

(65) Prior Publication Data
US 2020/0241178 A1    Jul. 30, 2020

(30) Foreign Application Priority Data
Jan. 29, 2018 (CN) .......................... 201810086358.9

(51) Int. Cl.
*F21V 21/00* (2006.01)
*G02B 5/04* (2006.01)
(Continued)

(52) U.S. Cl.
CPC ....... *G02B 5/045* (2013.01); *G02F 1/133606* (2013.01); *G02F 1/133607* (2021.01)

(58) Field of Classification Search
CPC .. G02B 5/045; G02B 5/06; G02B 5/04; G02F 1/133606; G02F 2001/133607
(Continued)

(56) References Cited

U.S. PATENT DOCUMENTS 10,578,918 B2 * 3/2020 Saito ................. G02F 1/133605
2003/0223216 A1   12/2003 Emmons et al.
(Continued)

FOREIGN PATENT DOCUMENTS

CN    1656395 A    8/2005
CN    1900744 A    1/2007
(Continued)

OTHER PUBLICATIONS

International Search Report and Written Opinion issued in corresponding International Application No. PCT/CN2018/117951, dated Feb. 27, 2019, with English language translation.
(Continued)

*Primary Examiner* — Laura K Tso
(74) *Attorney, Agent, or Firm* — McDermott Will and Emery LLP

(57) ABSTRACT

A prism sheet includes a prism substrate having at least one cavity therein and a plurality of prism microstructures arranged on a light exit surface of the prism substrate.

14 Claims, 4 Drawing Sheets

(51) Int. Cl.
  *G02F 1/13357* (2006.01)
  *G02F 1/1335* (2006.01)

(58) Field of Classification Search
  USPC .......................................................... 362/339
  See application file for complete search history.

(56) References Cited

U.S. PATENT DOCUMENTS

| | | | |
|---|---|---|---|
| 2006/0007302 A1* | 1/2006 | Numata | G02F 1/133524 348/71 |
| 2006/0139947 A1 | 6/2006 | Mai et al. | |
| 2007/0019410 A1 | 1/2007 | Kim et al. | |
| 2012/0014132 A1* | 1/2012 | Chiang | G02F 1/133606 362/607 |
| 2017/0184256 A1 | 6/2017 | Horvath et al. | |
| 2020/0241178 A1 | 7/2020 | Li et al. | |

FOREIGN PATENT DOCUMENTS

| | | |
|---|---|---|
| CN | 101178506 A | 5/2008 |
| CN | 101595404 A | 12/2009 |
| CN | 102393545 A | 3/2012 |
| CN | 203444128 U | 2/2014 |
| CN | 204228987 U | 3/2015 |
| CN | 104854483 A | 8/2015 |
| CN | 107991725 A | 5/2018 |
| KR | 10-0883781 B1 | 2/2009 |
| TW | M270375 U | 7/2005 |

OTHER PUBLICATIONS

First Chinese Office Action issued in Chinese Application No. 201810086358.9, dated Mar. 7, 2019, with English language translation.

Second Chinese Office Action issued in Chinese Application No. 201810086358.9, dated Sep. 2, 2019, with English language translation.

* cited by examiner

PRISM SHEET, BACKLIGHT MODULE AND DISPLAY DEVICE

CROSS-REFERENCE TO RELATED APPLICATIONS

This application is a national phase entry under 35 USC 371 of International Patent Application No. PCT/CN2018/117951 filed on Nov. 28, 2018, which claims priority to Chinese Patent Application No. 201810086358.9, filed with the Chinese Patent Office on Jan. 29, 2018, titled "A PRISM, BACKLIGHT MODULE AND DISPLAY DEVICE", which are incorporated herein by reference in their entirety.

TECHNICAL FIELD

The present disclosure relates to the field of display technologies, and in particular, to a prism sheet, a backlight module, and a display device.

BACKGROUND

Since liquid crystal molecules cannot emit light on their own, a liquid crystal display (LCD) panel needs a backlight module to provide a light source. The backlight module usually includes a backlight, a light guide plate, an upper prism sheet, a lower prism sheet, and other structures.

In the backlight module, a light guide plate converts a point light source or a linear light source provided by the backlight into an area light source. Then, the area light diffused in various directions is converged by prism sheets (including the upper prism sheet and the lower prism sheet), thereby achieving an effect of enhancing brightness.

SUMMARY

A first aspect of embodiments of the present disclosure provides a prism sheet, which includes a prism substrate having at least one cavity therein and a plurality of prism microstructures arranged on a light exit surface of the prism substrate.

In some embodiments of the present disclosure, the at least one cavity is at least one blind hole disposed in a light incident surface of the prism substrate or the light exit surface of the prism substrate.

In some embodiments of the present disclosure, the at least one cavity is at least one through hole passing through both a light incident surface of the prism substrate and the light exit surface of the prism substrate opposite to each other.

In some embodiments of the present disclosure, the at least one cavity is at least one hollow cavity disposed inside the prism substrate.

In some embodiments of the present disclosure, the at least one cavity has a columnar structure and includes a first surface and a second surface opposite to each other. The first surface is closer to a light incident surface of the prism substrate than the second surface and the second surface is closer to the light exit surface of the prism substrate than the first surface. The first surface and the light incident surface of the prism substrate have a distance therebetween, and the second surface and the light exit surface of the prism substrate have a distance therebetween.

In some embodiments of the present disclosure, an angle between a central axis of each cavity and the light incident surface of the prism substrate is 45° to 135°.

In some embodiments of the present disclosure, the at least one cavity has a cylindrical structure.

In some embodiments of the present disclosure, a diameter of each cavity is less than or equal to 10 μm.

In some embodiments of the present disclosure, the cavity has a prismatic structure.

In some embodiments of the present disclosure, a maximum width of each cavity is less than or equal to 10 μm.

In some embodiments of the present disclosure, the at least one cavity includes a plurality of cavities that are evenly distributed and spaced apart from each other.

In some embodiments of the present disclosure, central axes of the plurality of cavities are perpendicular to the light incident surface of the prism substrate.

In some embodiments of the present disclosure, an orthographic projection of a cavity directly below a prism microstructure on a light incident surface of the prism substrate is in a range of an orthographic projection of the prism microstructure on the light incident surface of the prism substrate.

In some embodiments of the present disclosure, orthographic projections of a plurality of cavities on a light incident surface of the prism substrate are in a range of an orthographic projection of each prism microstructure on the light incident surface of the prism substrate.

A second aspect of embodiments of the present disclosure provides a backlight module, which includes any one of the prism sheets described above.

A third aspect of embodiments of the present disclosure provides a display device, which includes the backlight module described above.

A forth aspect of embodiments of the present disclosure provides a method of fabricating the prism sheet described above. The method includes: providing a prism substrate; forming at least one cavity in the prism substrate; and forming a plurality of prism microstructures on the light exit surface of the prism substrate.

In some embodiments of the present disclosure, the prism substrate includes a first substrate layer and a second substrate layer. The step of forming at least one cavity in the prism substrate includes: forming at least one blind hole in a surface of the first substrate layer, and forming the second substrate layer on the first substrate layer by bonding to cover the at least one blind hole.

In some embodiments of the present disclosure, a thickness of the first substrate layer is greater than a thickness of the second substrate layer.

In some embodiments of the present disclosure, the step of forming at least one cavity in the prism substrate includes: forming at least one through hole or at least one blind hole in the prism substrate directly. The at least one through hole passes through both the light exit surface and a light incident surface of the prism substrate, and the at least one blind hole passes through the light exit surface or the light incident surface of the prism substrate.

BRIEF DESCRIPTION OF THE DRAWINGS

In order to describe technical solutions in embodiments of the present disclosure or the prior art more clearly, the accompanying drawings to be used in the description of embodiments or the prior art will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

In order to make the objects, technical solutions and advantages of embodiments of the present disclosure clearer; the technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

In structural design of small- and medium-sized liquid crystal display (LCD) panels, since a size of a LCD panel is limited, an edge-lit backlight is usually adopted as a backlight. For example; a light emitting diode (LED) bar is adopted. A light guide plate converts a linear light source provided by the LED bar into an area light source, and then the area light diffused in various directions is converged by an upper prism sheet and a lower prism sheet, thereby achieving an effect of enhancing brightness.

Figure 1:
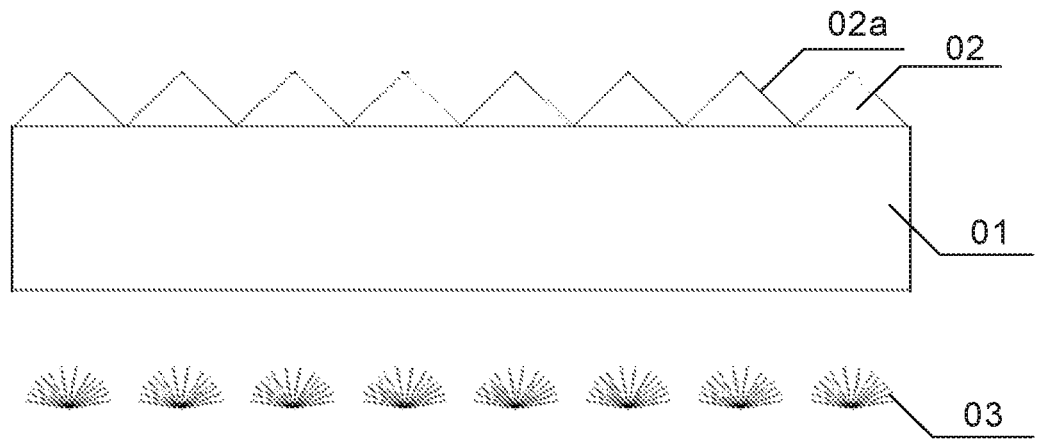
FIG. 1 is a schematic cross-sectional view of a prism sheet in the related art.

FIG. 1 is a schematic cross-sectional view of a prism sheet in the related art. The prism sheet includes a prism substrate 01 and prism microstructures 02. A material of the prism microstructures 02 is, for example, ultraviolet curing adhesive (i.e., UV adhesive). The prism microstructures 02 may be formed by coating an upper surface of the prism substrate 01 with the UV adhesive and curing it. A light guide plate guides light to form an area light source 03, and light of the area light source 03 will pass through the prism substrate 01 first to enter the prism microstructures 02. Then, the light is converged by prism surfaces 02a of the prism microstructures 02.

However, since the prism substrate 01 is a solid structure and has a certain thickness, a large light loss will be caused when the light of the area light source 03 passes through the prism substrate 01. Therefore, a brightness of a backlight module is relatively low.

Figure 2:
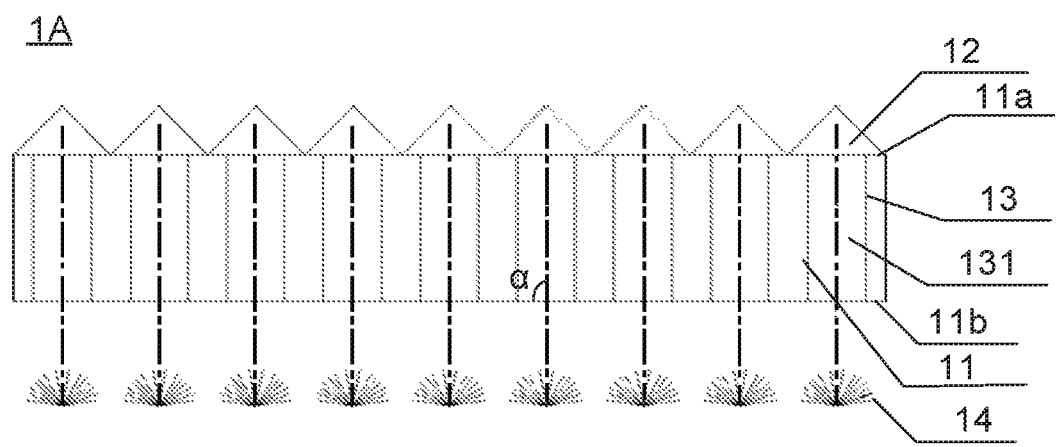
FIG. 2 is a schematic cross-sectional view of a prism sheet according to embodiments of the present disclosure.

A first aspect of embodiments of the present disclosure provides a prism sheet. As shown in FIG. 2, the prism sheet 1A includes a prism substrate 11, and a plurality of prism microstructures 12 arranged on a light exit surface 11a of the prism substrate 11. The prism substrate 11 is provided with at least one cavity 13 therein.

With continued reference to FIG. 2, a lower surface of the prism substrate 11 facing the area light source 14 is a light incident surface 11b of the prism substrate 11. Accordingly, an upper surface of the prism substrate 11 away from the area light source 14 is the light exit surface 11a of the prism substrate 11.

The prism substrate 11 may be made of a transparent material or a high-transmittance material such as PET (i.e., polyethylene terephthalate, commonly known as polyester, dacron, etc.).

The number, distribution, and size of the prism microstructures 12 are not limited in embodiments of the present disclosure, and can be set by any person skilled in the art according to design requirements of relevant optical parameters.

The prism microstructures 12 may be made of, for example, an UV adhesive, and may be formed by coating the upper surface of the prism substrate 11 with the UV adhesive and curing it.

The number, distribution, shape, and size of the cavity 13 are also not limited in embodiments of the present disclosure.

The prism substrate in the prism sheet provided in the related art is an overall solid structure, Contrary to the related art, in embodiments of the present disclosure, at least one cavity 13 is provided in the prism substrate 11, so that a part of light incident into the prism substrate 11 will pass through the cavity 13, Therefore, a loss of the incident light caused by the entire prism substrate 11 may be reduced, and the brightness of the backlight module may be improved if the prism sheet 1A is applied to the backlight module.

In addition, by providing the at least one cavity 13 in the prism substrate 11, an internal stress of the prism sheet 1A may be released, thereby improving a reliability of a product. For example, when the prism sheet 1A is squeezed, the at least one cavity 13 in the prism substrate 11 may be able to disperse part of the stress, thereby preventing the prism substrate 11 from being deformed or reducing a degree of deformation of the prism substrate 11, and thus improving the reliability of the product.

Figure 3:
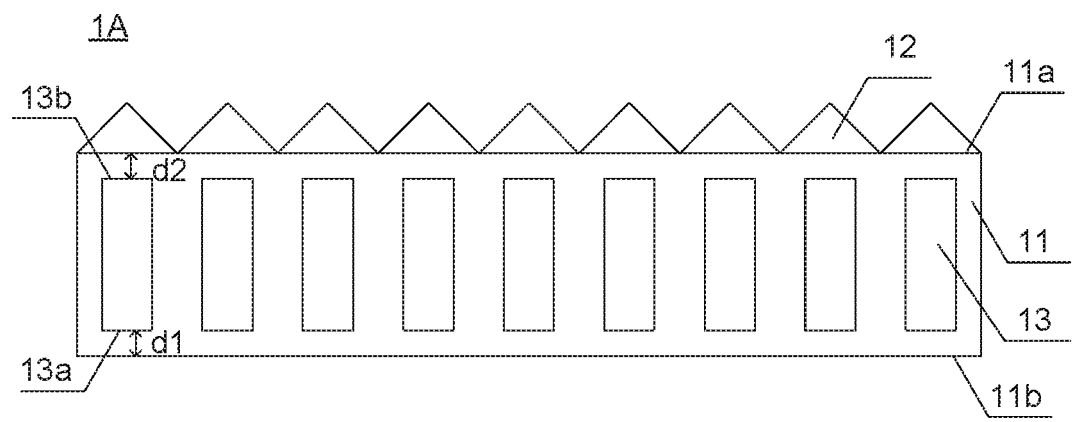
FIG. 3 is a schematic cross-sectional view of another prism sheet according to embodiments of the present disclosure.

For example, as shown in FIG. 3, the cavity 13 includes a first surface 13a and a second surface 13b respectively facing the light incident surface 11b of the prism substrate 11 and the light exit surface 11a of the prism substrate 11. There is a distance (marked as d1 in FIG. 3) between the first surface 13a and the light incident surface 11b of the prism substrate 11, and there is a distance (marked as d2 in FIG. 3) between the second surface 13b and the light exit surface 11a of the prism substrate 11. That is, the cavity 13 may be a hollow cavity that is disposed inside the prism substrate 11 and does not pass through the light exit surface 11a or the light incident surface 11b of the prism substrate 11.

Herein, the distance d1 between the first surface 13a and the light incident surface 11b of the prism substrate 11 and the distance d2 between the second surface 13b and the light exit surface 11a of the prism substrate 11 may be equal or unequal. Specific sizes of the two distances and a ratio therebetween may be flexibly adjusted according to size requirements of the product, and are not limited in embodiments of the present disclosure.

Figure 4:
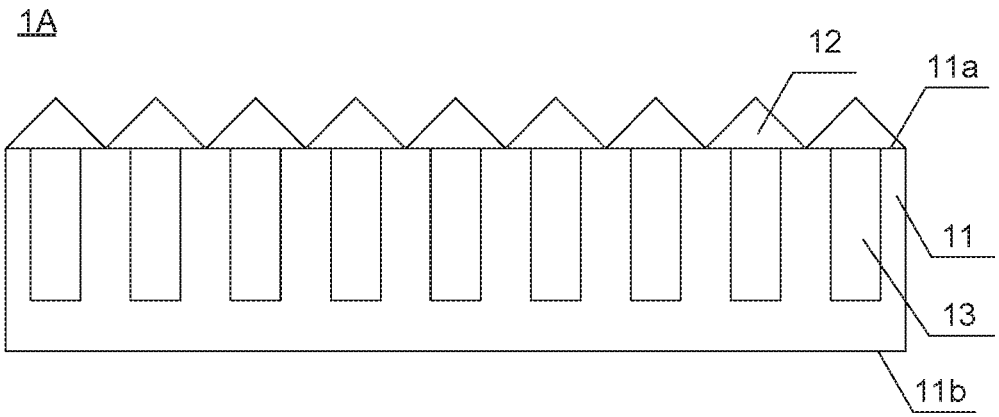
FIG. 4 is a schematic cross-sectional view of yet another prism sheet according to embodiments of the present disclosure.
Figure 5:
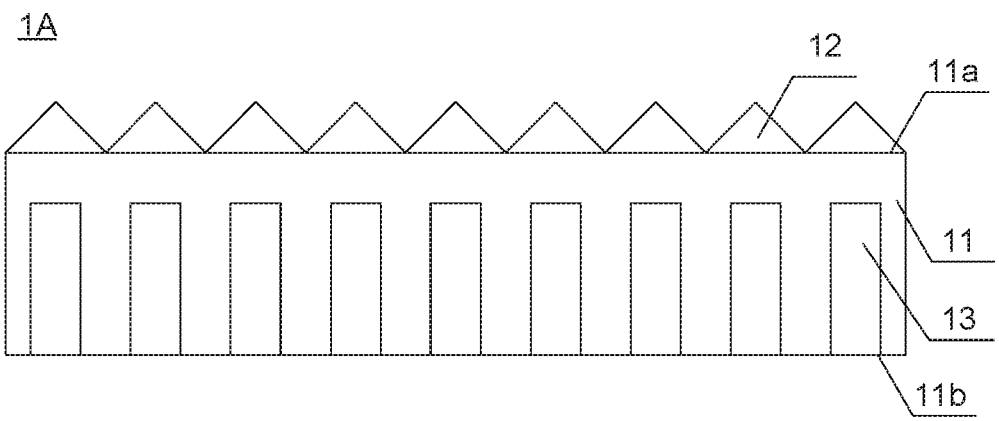
FIG. 5 is a schematic cross-sectional view of yet another prism sheet according to embodiments of the present disclosure.

Or, as shown in FIG. 4 or 5, the cavity 13 may be a blind hole disposed in the light exit surface 11a or the light incident surface 11b of the prism substrate 11. That is, the cavity 13 only passes through the light exit surface 11a or the light incident surface 11b.

Or, as shown in FIG. 2, the cavity 13 may be a through hole passing through both the light exit surface 11a and the light incident surface 11b of the prism substrate 11.

Herein, the cavity 13 is provided as a blind hole only passing through the light incident surface 11b or the light exit surface 11a of the prism substrate 11, as shown in FIG. 4 or 5; or, the cavity 13 is provided as a through hole passing through both the light incident surface 11b and the light exit surface 11a of the prism substrate 11, as shown in FIG. 2. Manufacturing processes of both designs are relatively simple, thereby making it easy to manufacture the prism sheet.

In order to facilitate production and minimize the loss of light caused by the prism substrate 11, as shown in FIG. 2, the cavity 13 is provided as a columnar structure passing through both the light incident surface 11b and the light exit surface 11a of the prism substrate 11.

Figure 6:
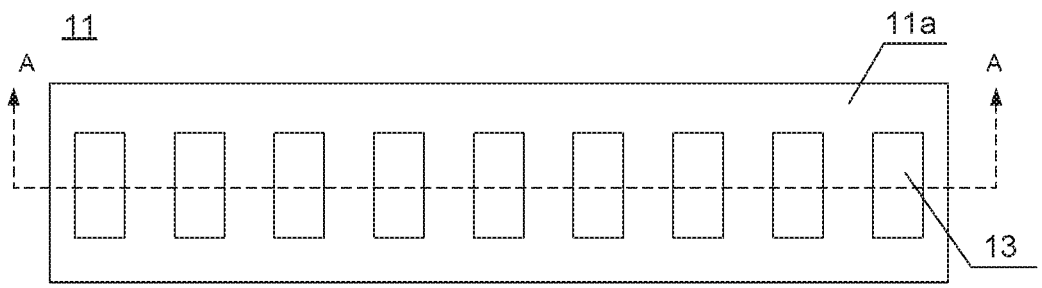
FIG. 6 is a schematic top view of a prism substrate in a prism sheet according to embodiments of the present disclosure, as viewed from a light exit surface of the prism substrate.

As shown in FIG. 6, in a direction perpendicular to the light exit surface 11a of the prism substrate 11, the columnar structure may be a prism (e.g., a rectangular prism shown in FIG. 6). Or, as shown in FIG. 7, in the direction perpendicular to the light exit surface 11a of the prism substrate 11, the columnar structure may be a cylinder.

Figure 7:
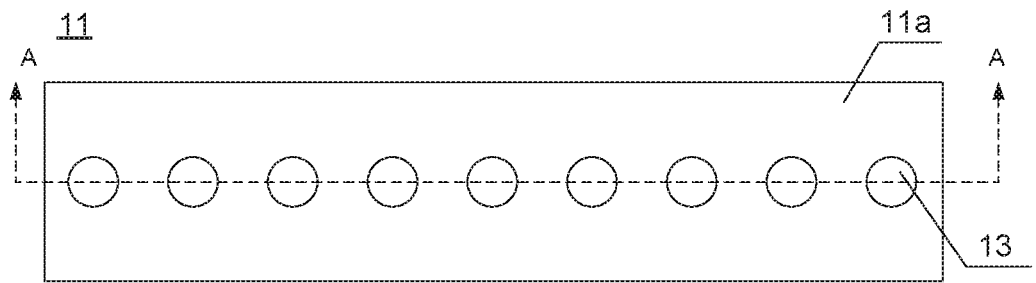
FIG. 7 is a schematic top view of another prism substrate of a prism sheet according to embodiments of the present disclosure, as viewed from a light exit surface of the another prism sheet.

FIGS. 2 to 5 are cross-sectional views in an AA direction in FIG. 6 or 7.

Herein, in order to further reduce the stress inside the prism substrate 11, the cavity 13 may be provided as a cylindrical structure.

With continued reference to FIG. 2, angles between light beams emitted from the area light source 14 and the light incident surface 11b of the prism substrate 11 are mostly concentrated in a range of 45° to 135°. Therefore, by setting an angle α between a central axis 131 of the cavity 13 (for example, a cavity that is a columnar structure) and the light incident surface 11b of the prism substrate 11 to 45° to 135°, it may be ensured that more light will pass through the cavity 13, and thus the loss of light in the prism substrate 11 may be minimized.

Herein, the "central axis" refers to a straight line that divides a plane into symmetrical parts or is such a straight line that a plane where the straight line is located divides a solid (that is, the cavity in embodiments of the present disclosure) into symmetrical parts. The "central axis" may also be referred to as "an axis".

For example, since the area light source 14 is usually located directly below the prism substrate 11 and most light enters the prism substrate 11 perpendicularly, the angle α between the central axis 131 of the cavity 13 (for example, a cavity that is a columnar structure) and the light incident surface 11b of the prism substrate 11 may be set to 90°. In this way, the loss of light in the prism substrate 11 may be further reduced.

Since the most critical and precise structure in the prism sheet is the prism microstructures 12, in order to prevent the prism microstructures 12 from being affected during a process of forming the cavity 13 in the prism substrate 11, in a fabrication process of the prism 1A, the cavity/cavities 13 may be formed in the prism substrate 11 first, and then the prism microstructures 12 may be formed on the prism substrate 11 having the cavity/cavities 13.

Herein, a method of forming the cavity 13 may be, for example, mechanical cutting, wet or dry etching, nanoimprinting, or laser drilling; and a method of forming the prism microstructures 12 may be, for example, coating the prism substrate 11 with the UV adhesive and curing it.

In this case, referring to FIG. 4, in a case where the cavity 13 is a blind hole passing through only the light exit surface 11a of the prism substrate 11, or referring to FIG. 2, in a case where the cavity 13 is a through hole passing through both the light exit surface 11a and the light incident surface 11b of the prism substrate 11, a region in which the cavity 13 passes through the light exit surface 11a of the prism substrate 11 cannot be too large. Otherwise, when the prism substrate 11 is being coated with the UV adhesive, the UV adhesive may be poured into the cavity 13 through the region in which the cavity 13 passes through the light exit surface 11a of the prism substrate 11, and thereby affect fabrication of the prism microstructures 12.

Considering that in the related art, a particle diameter of the UV adhesive is generally greater than 10 μm, in a case where the cavity 13 is a cylindrical structure, a diameter of the cavity 13 is less than or equal to 10 μm; and in a case where the cavity 13 is a prismatic structure, a maximum width of the cavity 13 is less than or equal to 10 μm.

Herein, in the case where the cavity 13 is a prismatic structure, the "maximum width" refers to a maximum distance between any two points in a cross-sectional view of the cavity 13.

For example, with continued reference to FIGS. 2 to 7, the prism substrate 11 is provided therein with a plurality of cavities 13 that are evenly distributed and spaced apart from each other, and the plurality of cavities 13 perpendicularly correspond to the plurality of prism microstructures 12 in one-to-one correspondence. In this way, on a basis of providing as many cavities 13 as possible to reduce light loss, it may also be possible to ensure that a brightness of light emitted from each prism microstructure 12 in the prism 1A is as uniform as possible.

Herein, "the plurality of cavities 13 perpendicularly correspond to the plurality of prism microstructures 12 in one-to-one correspondence" means that in a direction perpendicular to the light incident surface 11b of the prism substrate 11, each prism microstructure 12 corresponds to a cavity 13 located directly below it.

For example, with continued reference to FIGS. 2 to 5, an orthographic projection of each prism microstructure 12 on the light incident surface 11b of the prism substrate 11 covers an orthographic projection of at least one cavity 13 on the light incident surface 11b.

Herein, since the orthographic projection of the cavity 13 on the light incident surface 11b of the prism substrate 11 may have different shapes, it may be arranged that the orthographic projection of each prism microstructure 12 on the light incident surface 11b of the prism substrate 11 covers orthographic projection(s) of one or more cavities 13 on the light incident surface 11b.

For example, in a case where the orthographic projection of the cavity 13 on the light incident surface 11b of the prism substrate 11 is in a shape of a circle as shown in FIG. 7 (that is, in a case where the cavity 13 is a cylindrical structure), since a three-dimensional shape of a prism microstructure 12 is a strip (the strip extends in a direction perpendicular to a plane of the paper in FIGS. 2 to 5), in order to make more light incident on the light incident surface 11b of the prism substrate 11 pass through the cavity 13 and directly hit the prism microstructure 12 and therefore further reduce the loss of light when light passes through the prism substrate 11, it may be arranged that the orthographic projection of each prism microstructure 12 on the light incident surface 11b of the prism substrate 11 covers orthographic projections of multiple cavities 13 on the light incident surface 11b of the prism substrate 11. That is, the orthographic projections of multiple cavities 13 spaced apart from each other on the light incident surface 11b of the prism substrate 11 are in a range of the orthographic projection of each prism microstructure 12 on the light incident surface 11b of the prism substrate 11.

In a case where the orthographic projection of the cavity 13 on the light incident surface 11b of the prism substrate 11 is in a shape of a rectangle as shown in FIG. 6 (that is, in a case where the cavity 13 is a rectangular columnar structure), if a length of a long side of the rectangle is the same as or close to a length of the prism microstructure 12 in the extending direction(the prism microstructure 12 extends in a direction perpendicular to the plane of the paper in FIGS. 2 to 5), it may be arranged that the orthographic projection of each prism microstructure 12 on the light incident surface 11b of the prism substrate 11 covers an orthographic projection of a single cavity 13 on the light incident surface 11b of the prism substrate 11.

The above arrangement manners are only for illustration. The number and arrangement manner of the cavity 13 covered by each prism microstructure 12 may be flexibly adjusted according to a structure and arrangement manner of the prism microstructures 12, as long as the light incident on the light incident surface 11b of the prism substrate 11 passes through the cavity 13 and directly hits the prism microstructure 12 as much as possible, so as to minimize the loss of light passing through the prism substrate 11.

Embodiments of the present disclosure further provide a method of fabricating the prism sheet 1A, and the method includes the following steps S01 to S02:

S01: providing a prism substrate 11 and forming at least one cavity 13 in the prism substrate 11; and S02: forming a plurality of prism microstructures 12 on a light exit surface 11a of the prism substrate 11.

Beneficial effects that can be achieved by the method of fabricating the prism sheet 1A are the same as beneficial effects that can be achieved by the prism sheet 1A provided in the foregoing embodiments of the present disclosure, and will not be repeated here.

In S01, a method of forming the at least one cavity 13 includes, but is not limited to, mechanical cutting, wet etching, dry etching, nano-imprinting, and laser drilling.

In S02, a method of forming the plurality of prism microstructures 12 may be, for example, coating the light exit surface 11a of the prism substrate 11 with the UV adhesive and curing it.

Figure 8:
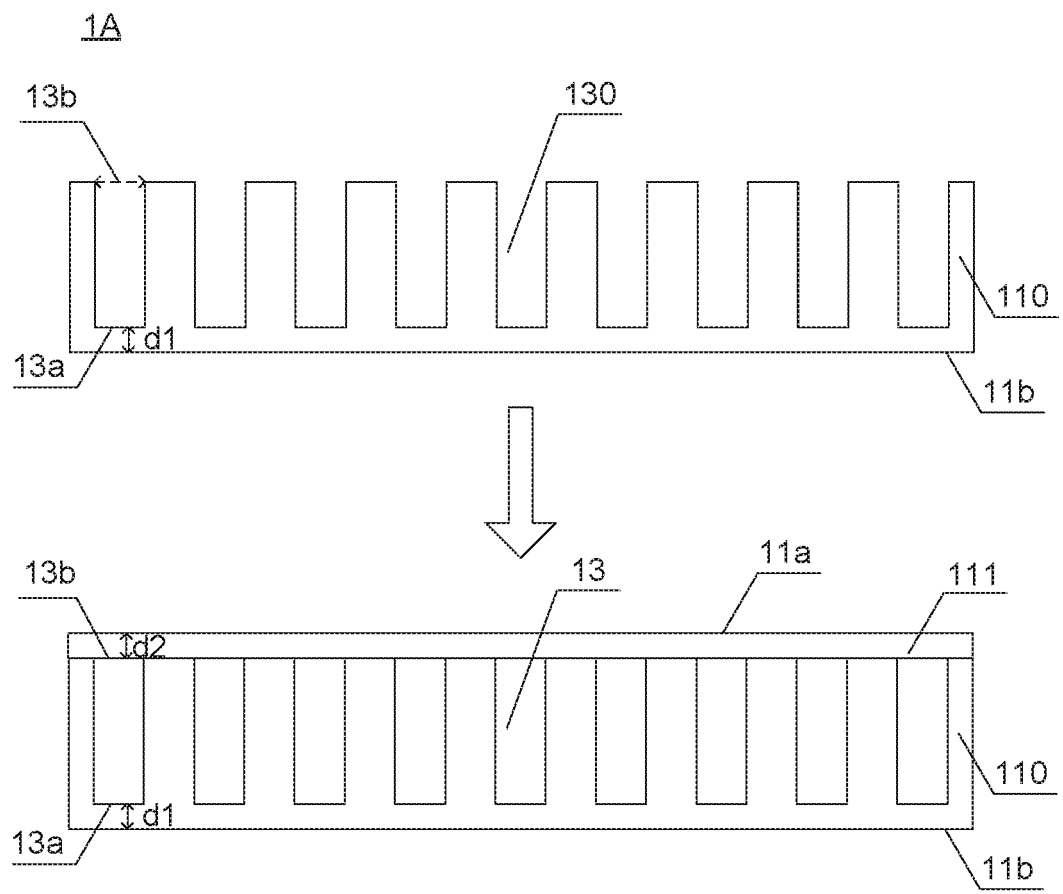
FIG. 8 is a schematic diagram of a method of fabricating cavities in a prism substrate in a prism sheet according to embodiments of the present disclosure.

For example, in a case where the cavity 13 is a hollow cavity as shown in FIG. 3 (that is, in a case where the cavity 13 is disposed inside the prism substrate 11 and does not pass through the light exit surface 11a or the light incident surface 11b of the prism substrate 11), the prism substrate 11 may be divided into a first substrate layer and a second substrate layer that are arranged one above another. A side of the first substrate layer away from the second substrate layer is the light incident surface 11b of the prism substrate 11, and a side of the second substrate layer away from the first substrate layer is the light exit surface 11a of the prism substrate 11. Correspondingly, as shown in FIG. 8, steps of forming the cavity 13 are as follows.

(1) A blind hole 130 is formed in a surface of the first substrate layer 110 by at least one of mechanical cutting, wet etching, dry etching, nano-imprinting, or laser drilling. A bottom of the blind hole 130 is a first surface 13a of the cavity to be formed facing the light incident surface 11b.

(2) The second substrate layer 111 that covers the first substrate layer 110 is bonded to the first substrate layer 110. That is, an opening 13b of the blind hole is covered by the second substrate layer 111. The opening of the blind hole is a second surface 13b of the cavity 13 facing the light exit surface 11a. In this way, the cavity 13 is formed.

By covering the second substrate layer 111 on the first substrate layer 110 using a method of bonding, it may be possible to avoid a problem of the second substrate layer 111 filling up the blind hole formed in a previous step and causing it difficult to form the cavity in a case where a method such as deposition or coating is used.

Since the blind hole needs to be formed in the first substrate layer and the blind hole has a certain depth, a thickness of the first substrate layer should be large. A role of the second substrate layer is merely to cover the first substrate layer, so that the opening of the blind hole is covered and the blind hole is turned into the cavity 13. Therefore, the second substrate layer does not need to be thick, and a thickness of the second substrate layer may be less than that of the first substrate layer.

Herein, one of mechanical cutting, wet etching, dry etching, nano-imprinting or laser drilling, or a combination thereof may be flexibly selected to form the blind hole according to parameters such as the thickness and type of material of the first substrate layer, and a size of the blind hole to be formed (e.g., a depth of the blind hole, or a width of a cross section of the blind hole).

In the case where the cavity 13 is a through hole passing through both the light exit surface 11a and the light incident surface 11b of the prism substrate 11 as shown in FIG. 2, or, in the case where the cavity 13 is a blind hole passing through only the light exit surface 11a or the light incident surface 11b as shown in FIG. 4 or 5, the prism substrate 11 may be directly formed, and then the through hole or the blind hole may be formed in the prism substrate 11 to form the cavity 13. As for a method of forming the through hole or the blind hole, reference may be made to the above descriptions, and details will not be repeated here.

A specific experiment is provided below to further explain the prism sheet 1A provided in embodiments of the present disclosure.

Referring to FIGS. 1 and 2 and Table 1, the prism sheet provided in the related art has a diagonal of 10.1 inches, a length of 219.05 mm, a width of 137.36 mm, and a thickness of 0.102 mm (a thickness of a prism substrate is 0.075 mm and a thickness of prism microstructures is 0.027 mm), and its optical gain is 1.58.

A length, width, and thickness of the prism sheet 1A provided in the embodiments of the present disclosure, and relevant dimensions and parameters of the prism substrate 11 and prism microstructures 12 therein are the same as those of the prism sheet provided in the related art. However, the prism substrate 11 is provided therein with cavities that are evenly distributed.

By adopting a design provided in the embodiments of the present disclosure, an optical gain of the prism sheet 1A may be increased to 1.72, which is 8.86% higher than the optical gain of the prism sheet in the related art.

A high-temperature reliability test is performed on the prism sheet in the related art. The prism sheet is placed in a high-temperature precision experimental machine and is heated at 150° C. for 30 minutes. After the high-temperature treatment, the length and width of the prism sheet are respectively changed from 219.05 mm×137.36 mm before the experiment to 221.50 mm×137.83 mm after the experiment. A longitudinal elongation and a transverse elongation of the prism sheet are 1.12% and 0.34%, respectively.

After the prism sheet 1A provided in the embodiments of the present disclosure undergoes a high-temperature reliability test under the same conditions, the length and width of the prism sheet 1A are respectively changed from 219.05 mm×137.36 mm before the experiment to 219.66 mm×137.48 mm after the experiment. A longitudinal elongation and a transverse elongation of the prism sheet 1A are 0.28% and 0.085%, respectively, which are significantly lower than those of the prism sheet provided in the related art. Specific test parameters are shown in Table 1 below.

backlight module 1B, relevant technologies may be used, which will not be repeated in embodiments of the present disclosure.

Figure 10:
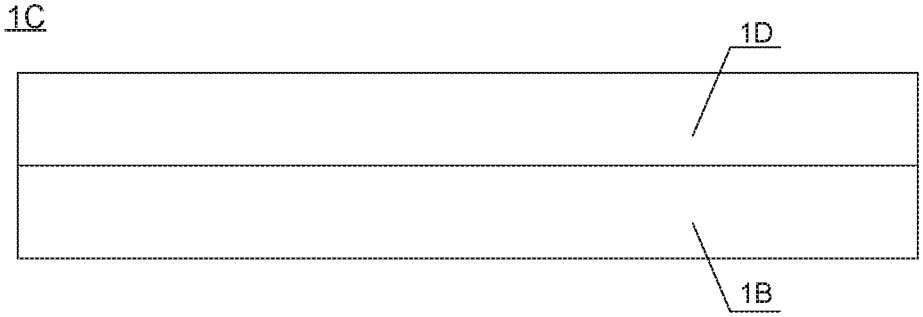
FIG. 10 is a schematic cross-sectional view of a display device according to embodiments of the present disclosure.

A third aspect of embodiments of the present disclosure provides a display device. As shown in FIG. 10, the display device 1C includes the backlight module 1B described above.

With continued reference to FIG. 10, the display device 10 further includes a display panel 1D, and the backlight module 1B provides a light source for the display panel 1D.

The display device provided in the embodiments of the present disclosure may be any device that displays an image whether in motion (e.g., video) or stationary (e.g., a still

TABLE 1

Performance comparison of the prism sheet provided in the related art and the prism sheet provided in the embodiments of the present disclosure

| | Optical gain | Optical gain increase/% | High-temperature reliability test | | | | Longitudinal elongation/% | Transverse elongation/% |
|---|---|---|---|---|---|---|---|---|
| | | | Before the experiment | | After the experiment | | | |
| | | | Length/mm | Width/mm | Length/mm | Width/mm | | |
| The related art | 1.58 | 8.86 | 219.05 | 137.36 | 221.50 | 137.83 | 1.12 | 0.34 |
| Embodiments of the present disclosure | 1.72 | | 219.05 | 137.36 | 219.66 | 137.48 | 0.28 | 0.085 |

It may be seen from the above comparative experiment that, in the embodiments of the present disclosure, by providing the cavity/cavities 13 in the prism substrate 11, the optical gain of the prism sheet 1A is improved. That is, the brightness of light coming out from the prism sheet 1A is improved. Therefore, the brightness of the backlight module including the prism sheet 1A may be improved. In the meantime, the prism sheet 1A provided in the embodiments of the present disclosure has a higher reliability. After the high temperature treatment, the longitudinal elongation and transverse elongation of the prism sheet are both less than those of the prism sheet provided in the related art.

Figure 9:
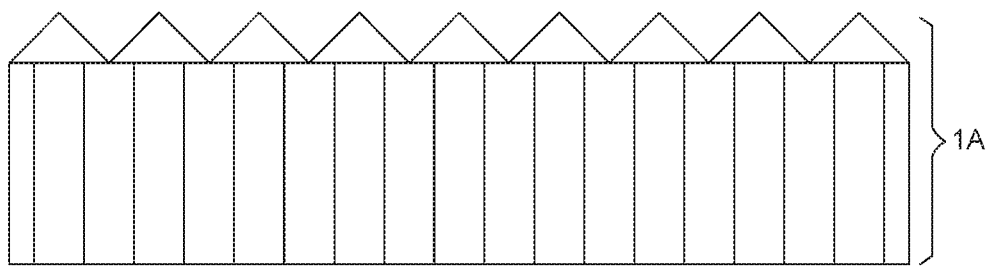
FIG. 9 is a schematic cross-sectional view of a backlight module according to embodiments of the present disclosure.

A second aspect of embodiments of the present disclosure provides a backlight module. As shown in FIG. 9, the backlight module 1B includes any one of the prism sheets 1A described above.

The prism substrate in the prism sheet provided in the related art is an overall solid structure. Contrary to the related art, in embodiments of the present disclosure, at least one cavity 13 is provided in the prism substrate 11, so that a part of light incident into the prism substrate 11 will pass through the cavity 13. Therefore, the loss of the incident light caused by the entire prism substrate 11 may be reduced, and the brightness of the backlight module may be improved if the prism sheet 1A is applied to the backlight module.

Herein, the prism sheet 1A described above may be used as the upper prism sheet, the lower prism sheet, or the upper prism sheet and the lower prism sheet in the backlight module 1B. The backlight module 1B may further include a light guide plate disposed on a light incident side 11b of the prism sheet 1A, a backlight disposed at a side face of the light guide plate or a bottom surface of light guide plate away from the prism sheet 1A, and other structures.

That is, the backlight module 1B may be an edge-lit backlight module (that is, the backlight is disposed at the side face of the light guide plate) or a direct-lit backlight module (that is, the backlight is disposed at a bottom surface of the light guide plate). As for specific structures of the image), and whether textual or pictorial. More specifically, it is contemplated that the embodiments may be implemented in or associated with a variety of electronic devices. The variety of electronic devices for example include (but are not limited to), mobile phones, wireless devices, portable android devices (PAD); hand-held or portable computers, global positioning system (GPS) receivers/navigators, cameras, MPEG-4 Part 14 (MP4) video players, video cameras, game consoles, watches, clocks, calculators, TV monitors, flat panel displays, computer monitors, car displays (e.g., odometer display), navigators, cockpit controllers and/or displays, camera view displays (e.g., rear view camera displays in a vehicle), electronic photos, electronic billboards or signages, projectors, building structures; and packaging and aesthetic structures (e.g., a display for an image of a piece of jewelry).

The foregoing descriptions are merely some specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A prism sheet, comprising:
  a prism substrate having at least one cavity therein; and
  a plurality of prism microstructures arranged on a light exit surface of the prism substrate, wherein
  the at least one cavity is at least one through hole passing through both a light incident surface of the prism substrate and the light exit surface of the prism substrate that are opposite to each other.

2. The prism sheet according to claim 1, wherein an angle between a central axis of each cavity and a light incident surface of the prism substrate is 45° to 135°.

3. The prism sheet according to claim 1, wherein the at least one cavity has a cylindrical structure.

4. The prism sheet according to claim 3, wherein a diameter of each cavity is less than or equal to 10 µm.

5. The prism sheet according to claim 1, wherein the at least one cavity has a prismatic structure.

6. The prism sheet according to claim 1, wherein the at least one cavity includes a plurality of cavities that are evenly distributed and spaced apart from each other.

7. The prism sheet according to claim 6, wherein central axes of the plurality of cavities are perpendicular to a light incident surface of the prism substrate.

8. The prism sheet according to claim 6, wherein an orthogonal projection of a cavity perpendicularly corresponding to a prism microstructure on a light incident surface of the prism substrate is in a range of an orthographic projection of the prism microstructure on the light incident surface of the prism substrate.

9. The prism sheet according to claim 6, wherein orthogonal projections of a plurality of cavities on a light incident surface of the prism substrate are in a range of an orthographic projection of each prism microstructure on the light incident surface of the prism substrate.

10. A backlight module, comprising the prism sheet according to claim 1.

11. A display device, comprising the backlight module according to claim 10.

12. The prism sheet according to claim 5, wherein a maximum width of each cavity is less than or equal to 10 µm.

13. A method of fabricating the prism sheet according to claim 1, the method comprising:
 providing a prism substrate, wherein the prism substrate includes a first substrate layer and a second substrate layer;
 forming at least one blind hole in a surface of the first substrate layer;
 forming the second substrate layer on the first substrate layer by bonding to cover the at least one blind hole; and
 forming a plurality of prism microstructures on the light exit surface of the prism substrate.

14. The method according to claim 13, wherein a thickness of the first substrate layer is greater than a thickness of the second substrate layer.

* * * * *